US011218760B2

(12) United States Patent
Gupta et al.

(10) Patent No.: US 11,218,760 B2
(45) Date of Patent: Jan. 4, 2022

(54) PROVIDING A MESSAGE BASED ON A CHANGE IN WATCH TIME

(71) Applicant: Google LLC, Mountain View, CA (US)

(72) Inventors: Prachi Gupta, Los Altos, CA (US); Eyal Manor, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/933,750

(22) Filed: Jul. 20, 2020

(65) Prior Publication Data

US 2020/0351535 A1 Nov. 5, 2020

Related U.S. Application Data

(63) Continuation of application No. 15/178,372, filed on Jun. 9, 2016, now Pat. No. 10,721,513.

(51) Int. Cl.
| H04N 21/266 | (2011.01) |
| H04N 21/2668 | (2011.01) |
| H04N 21/81 | (2011.01) |
| H04N 21/442 | (2011.01) |
| H04N 21/25 | (2011.01) |
| G06Q 30/02 | (2012.01) |

(52) U.S. Cl.
CPC ....... *H04N 21/2668* (2013.01); *H04N 21/252* (2013.01); *H04N 21/44204* (2013.01);
(Continued)

(58) Field of Classification Search
CPC ............. H04N 21/2668; H04N 21/812; H04N 21/44202; G06Q 30/0241; G06Q 30/0242
See application file for complete search history.

(56) References Cited

U.S. PATENT DOCUMENTS

| 9,094,735 B1 * | 7/2015 | Abdalla | ............. H04N 21/2387 |
| 2004/0103436 A1 * | 5/2004 | Shikata | .................. H04H 20/86 |
| | | | 725/83 |

(Continued)

OTHER PUBLICATIONS

"An Audience of One: Behaviorally Targeted Ads as Implied Social Labels", by Summers et al. Published by Oxford University Press on behalf of Journal of consumer Research, Inc. vol. 43, Feb. 24, 2016. (Year: 2016).

*Primary Examiner* — Jefferey F Harold
*Assistant Examiner* — Timothy R Newlin
(74) *Attorney, Agent, or Firm* — Lowenstein Sandler LLP

(57) ABSTRACT

A request from a user to view a video content item may be received, the requesting user being associated with a set of preferences and a context. A group of similar users may be identified based at least one of: one or more preferences in the set of preferences or the context. A first promotional video item corresponding to the video content item may be identified. A first watch time value for a first portion of the group of similar users may be determined based on an amount of time during a period of time that users of the first portion of the group have viewed the video content item after being provided the first promotional video item. A second watch time value for a second portion of the group of similar users may be determined based on an amount of time during the period of time that the users of the second portion of the group have viewed the video content item, the first promotional video item not provided to the users of the second portion of the group. A watch time difference between the first watch time value and the second watch time value may be determined. An activity rate associated with the first promotional video item that was provided to the group of similar users may be determined. A determination of whether to provide the first promotional video item to the user with the video content item may be based on the (Continued)

watch time difference, the activity rate, or the context of the user.

18 Claims, 8 Drawing Sheets

(52) U.S. Cl.
CPC ..... *H04N 21/44213* (2013.01); *H04N 21/812* (2013.01); *G06Q 30/0241* (2013.01); *G06Q 30/0242* (2013.01)

(56) References Cited

U.S. PATENT DOCUMENTS

| | | | |
|---|---|---|---|
| 2007/0098165 A1* | 5/2007 | Yoshikawa | H04N 21/8352 380/211 |
| 2010/0100419 A1* | 4/2010 | Natoli | G06Q 30/02 705/7.31 |
| 2010/0251290 A1* | 9/2010 | Kodialam | H04N 21/25883 725/34 |
| 2010/0280876 A1* | 11/2010 | Bowra | H04N 21/262 705/14.41 |
| 2013/0024274 A1* | 1/2013 | Villars | G06Q 10/00 705/14.45 |
| 2013/0024879 A1* | 1/2013 | Bruich | H04N 21/812 725/9 |
| 2015/0371258 A1* | 12/2015 | Bramucci | G06Q 30/0246 705/14.45 |
| 2017/0094332 A1* | 3/2017 | Thomas | H04N 21/25891 |
| 2017/0169462 A1* | 6/2017 | Meredith | G06Q 30/0244 |
| 2018/0053212 A1* | 2/2018 | Beattie, Jr. | H04W 4/021 |
| 2020/0351535 A1* | 11/2020 | Gupta | H04N 21/812 |

* cited by examiner

PROVIDING A MESSAGE BASED ON A CHANGE IN WATCH TIME

CROSS REFERENCE TO RELATED APPLICATIONS

This application is a continuation of U.S. application Ser. No. 15/178,372, filed Jun. 9, 2016, the contents of which are entirely incorporated by reference.

TECHNICAL FIELD

This disclosure relates to the field of messages and, in particular, to providing a message based on a change in watch time.

BACKGROUND

A video content sharing platform may provide multiple video content items (e.g., videos) that may be accessed and viewed by users of the video content sharing platform. A message, such as a promotional advertisement, may be provided to the users to notify the users of a particular video content item that may be of interest to the users of the video content sharing platform. The users may interact with the message to access the video content item that is identified in the message by selecting the message. In response to the selection, the user may then view the video content item.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to provide a promotional message to a first portion of a group of users, identify a first watch time based on an amount of time during a period of time that users of the first portion of the group view the video content items after being provided the promotional message, identify a second watch time based on an amount of time during the period of time that users of a second portion of the group view the video content item where the promotional message is not provided to the users of the second portion of the group, calculate a difference between the first watch time and the second watch time, and determine whether to whether to provide the promotional message to a subsequent user sharing one or more characteristics with the group of users based on the difference between the first watch time and the second watch time.

In some implementations, the method may further provide the promotional message to the subsequent user in response to determining that the difference between the first watch time and the second watch time does not exceed a threshold value.

In some implementations, the method may further identify a context associated with the subsequent user where the determining whether to provide the promotional message associated with the video content items to the subsequent user may further be based on the context associated with the subsequent user satisfying one or more conditions associated with the promotional message.

In some implementations, the context is associated with at least one of a user interface of a content sharing platform providing the video content items, an interaction history of the subsequent user with the content sharing platform, or an indication of prior promotional messages provided to the subsequent user.

In some implementations, the method may further, in response to determining that the difference between the first watch time and the second watch time does not exceed a threshold value, identify an activity rate associated with the promotional message where the determining of whether to provide the promotional message is further based on the activity rate.

In some implementations, the activity rate corresponds to a click through rate of the promotional message or a conversion associated with the promotional message.

In some implementations, the first watch time corresponds to an average amount of time each user of the first portion of the group views the video content items during the period of time and the second watch time corresponds to an average amount of time each user of the second portion of the group views the video content items during the period of time.

In some implementations, a non-transitory machine-readable storage medium storing instructions may be executed to cause a processing device to perform operations such as providing a promotional message to a first portion of a group of users, identifying a first watch time based on an amount of time during a period of time that users of the first portion of the group view the video content items after being provided the promotional message, identifying a second watch time based on an amount of time during the period of time that users of a second portion of the group view the video content items, the promotional message not being provided to the users of the second portion of the group, calculating a difference between the first watch time and the second watch time, and determining whether to provide the promotional message to a subsequent user sharing one or more characteristics with the group of users based on the difference between the first watch time and the second watch time.

In some implementations, a system may include a memory and a processing device coupled with the memory. The processing device may provide a promotional message associated with a content sharing platform providing video content items to a first portion of a group of users that share at least one characteristic, identify a first watch time based on an average amount of time during a period of time that each user of the first portion of the group of users views video content items on the content sharing platform after being provided the promotional message, identify a second watch time based on an average amount of time during the period of time that each user of a second portion of the group of users view video content items on the content sharing platform where the promotional message may not be provided to the users of the second portion of the group of users, calculate a decrease in watch time for the first portion of the group of users relative to the second portion of the group of users based on a difference between the first watch time and the second watch time, and determine whether to provide the promotional message to a subsequent user that shares the at least one characteristic based on the decrease in watch time for the first portion of the group of users.

BRIEF DESCRIPTION OF THE DRAWINGS

The present disclosure is illustrated by way of example, and not by way of limitation, in the figures of the accompanying drawings.

DETAILED DESCRIPTION

Figure 1:
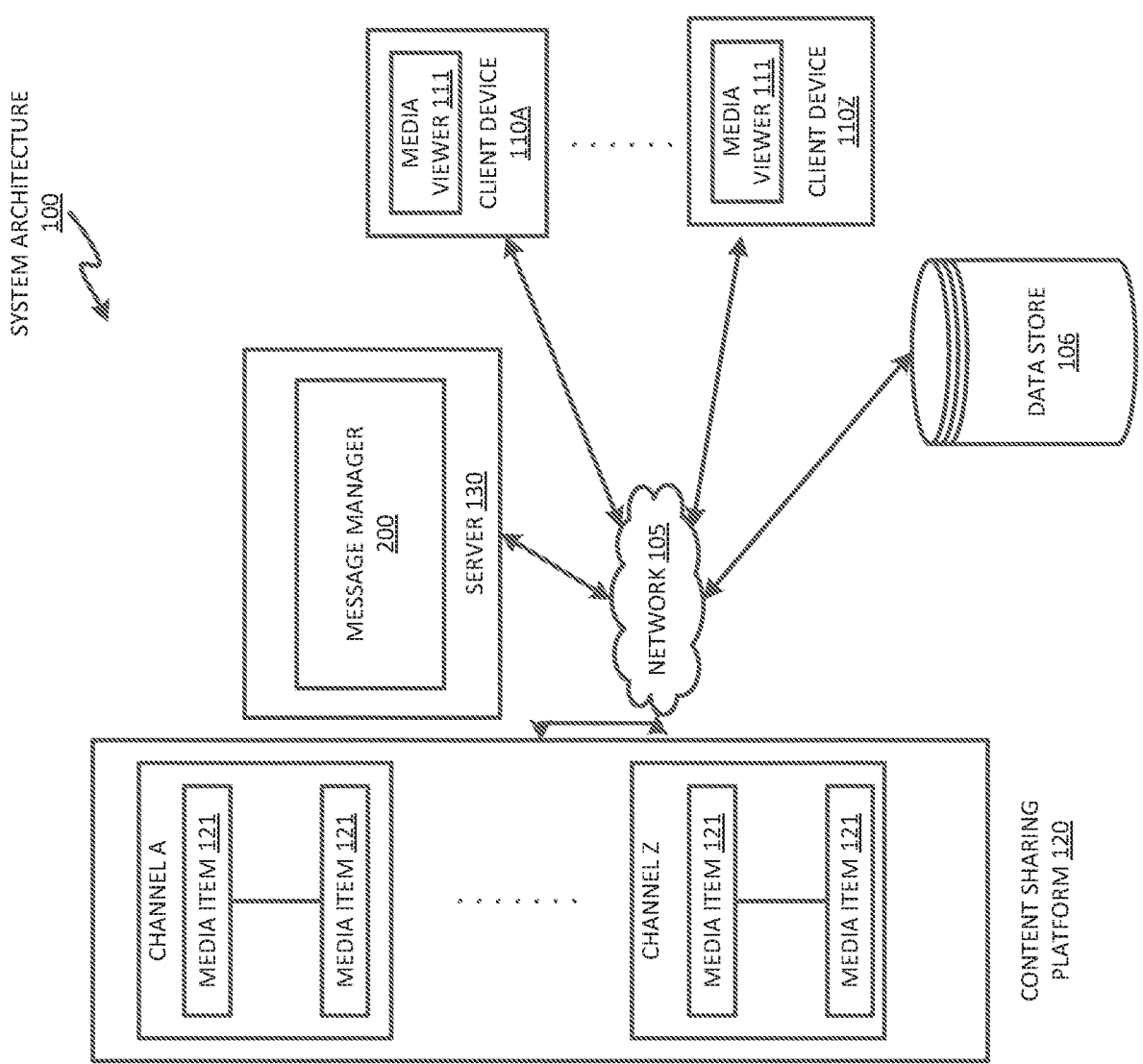
FIG. 1 illustrates an example system architecture in which implementations of the present disclosure may operate.

Aspects of the present disclosure relate to providing a message based on a change in watch time. A content sharing platform may provide multiple video content items (e.g., videos) that may be accessed and viewed by users of the content sharing platform.

The content sharing platform may provide a message to be displayed to the users of the content sharing platform. For example, the message may be an advertisement or other such notification that informs the users of another video content item or channel that is currently provided by the content sharing platform, a service of the content sharing platform (e.g., a subscription service for viewing video content items), an application that may be downloaded for viewing video content items, etc. The message may be provided based on broad targeting of users of the content sharing platform. For example, each user of the content sharing platform may be provided with a particular message when the user accesses the content sharing platform.

The providing of the message based on broad targeting of the users of the content sharing platform may change the interaction of the users with the content sharing platform. If the message provided to a user is not relevant to the user (e.g., the content of the message is not of interest to the user), then the user may stop interacting with the video content items of the content sharing platform by no longer viewing the video content items. For example, the user may interact with the content sharing platform by viewing the video content items for a first amount of time, then be provided the message, and then may view the video content items for a second amount of time that may be less than the first amount of time that the user spent viewing the video content items. Thus, the providing of the message may reduce the amount of time that users interact with the content sharing platform.

Aspects of the present disclosure address the above and other deficiencies by adjusting the providing of the message to a user of the content item platform based on a change in the watch time of a set of users of the content sharing platform. For example, a message may be provided to a set of users of the content sharing platform. A watch time of the set of users (e.g., an average amount of time that a user in the set of users spends viewing video content items) before the providing of the message may be identified and another watch time of the set of users after the providing of the message may be identified. If the watch time of the set of users has significantly decreased since being provided the message, then the message is likely to decrease the watch time of other users similar to the above set of users. Thus, the message is not provided to the other similar users that may share one or more characteristics with the set of users. Otherwise, if the watch time of the set of users increased or did not significantly decrease since being provided the message, then the message is likely to increase the watch time of similar users and, therefore, the message is provided to the similar users. Thus, the increase in the watch time may provide a better entertainment option for users of the content sharing platform.

As an example, watch times between groups of similar users may be compared to determine whether a particular message may significantly decrease (e.g., beyond a threshold amount of decrease) the watch time of the users. For example, a first portion of a group of similar users may be provided the message and a second portion of the group of similar users may not be provided the message. The first portion may correspond to a first watch time (e.g., an average watch time per user for the users of the first portion) after being provided the message and the second portion may correspond to a second watch time (e.g., an average watch time per user for the users of the second portion). The difference between the first watch time and the second watch time may be referred to as a watch time cost that may be used to estimate how the message changed the watch time of the first portion of users. If the difference between the first watch time and the second watch time exceeds a threshold amount, then the watch time cost of the message may be considered to be significant or high and the message may not be provided to a subsequent user who shares characteristics with the group of similar users.

In addition to the message being provided to a subsequent user based on the difference in watch time, the message may further be provided based on whether the message has resulted in an increase in activity associated with a service provided by the content sharing platform or an increase in activity associated with an application provided by the content sharing platform. For example, an increase in users registering for a subscription service offered by the content sharing platform (i.e., a conversion rate) after a message has been provided to users may result in the message being provided to similar users. Similarly, an increase in users downloading or acquiring an application (e.g., a mobile communications device application) that is used to interact with the content sharing platform after the message has been provided may also result in the message being provided to similar users. In some implementations, an increase in users clicking on or interacting with the message may result in the message being provided to similar users (i.e., a click through rate). As described in further detail below, a message associated with a difference in watch time that does not exceed a threshold amount of decrease in watch time may be ranked with other messages based on the increase in the activity. For example, rankings of messages that result in decreases in watch time that do not exceed the threshold amount of decrease in watch time may be improved based on the increase in a type of activity (e.g., click through rate or conversion rate) associated with the corresponding message.

Although aspects of the present disclosure describe video content items being provided by the content sharing platform and the providing of a message based on a video watch time, other types of content items and measures of interaction with the content sharing platform may be used to provide a message to users of the content sharing platform. For example, a change in the audio listening times of music content items or an audio book that are provided by the content sharing platform may similarly be used in the determination of whether to provide the message or to not provide the message for similar users of the content sharing platform.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices." Each client device includes a media viewer 111. In one implementation, the media viewers 111 may be applications that allow users to view content, such as images, videos (e.g., video content items), web pages, documents, etc. For example, the media viewer 111 may be a web browser that can access, retrieve, present, and/or navigate content (e.g., web pages such as Hyper Text Markup Language (HTML) pages, digital media items or content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media content items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121 (i.e., content items). Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a video content item.

A media item 121 may be consumed via the Internet and/or via a mobile device application. For brevity and simplicity, an online video (also hereinafter referred to as a video content item) is used as an example of a media item 121 throughout this document. As used herein, "media," media item," "online media item," "digital media," "digital media item," "content," "content item," and "video content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). The server 130 may be included in the content sharing platform 120 or be part of a different system. The server 130 may host a message manager 200 that determines whether or not to provide a message associated with video content items to a user. Further details with regard to the message manager 200 are disclosed in conjunction with FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
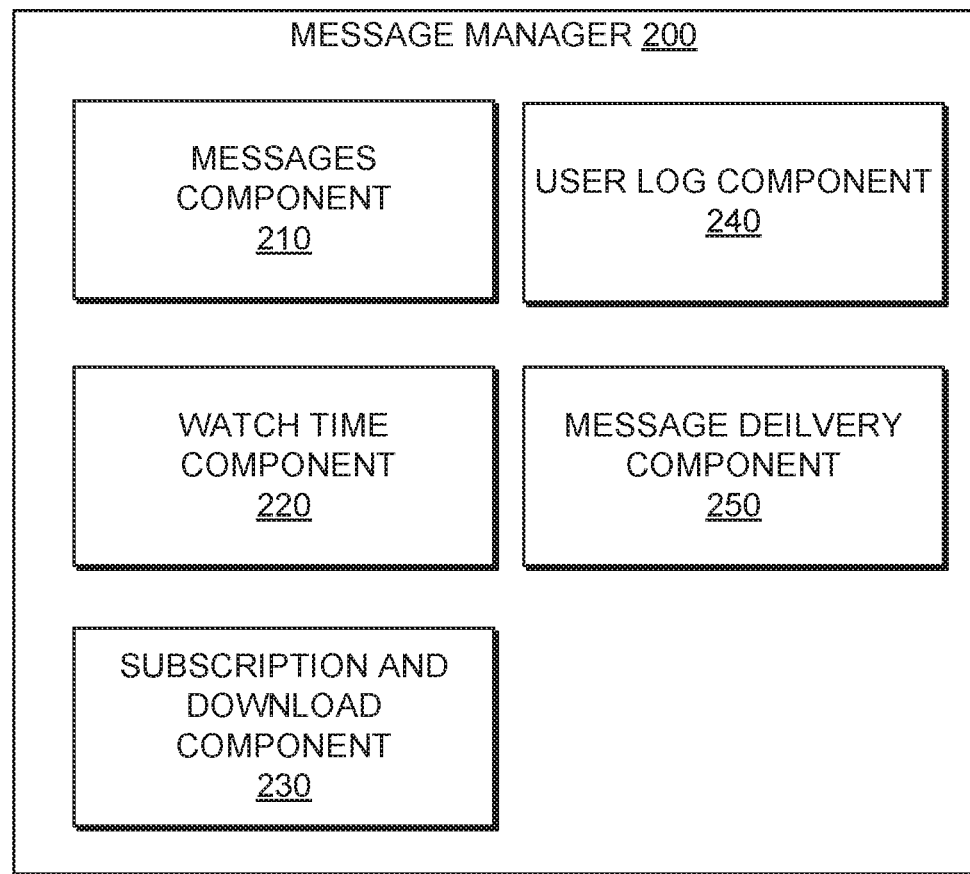
FIG. 2 illustrates an example message manager in accordance with some implementations of the disclosure.

FIG. 2 illustrates an example message manager 200. In general, the message manager 200 may correspond to the message manager 200 of a server system 130 as shown in FIG. 1. The message manager 200 may include a messages component 210, a watch time component 220, a subscription and download component 230, a user log component 240, and a message delivery component 250. In alternative implementations, the functionality of one or more of the components may be combined or divided.

As shown in FIG. 2, the message manager 200 may include a messages component 210 that may store one or more messages that may be selected to be provided to users of a content sharing platform. The messages may be promotional advertisements that identify another video content item provided by the content sharing platform, a channel of video content items provided by the content sharing platform, a subscription service to view video content items provided by the content sharing platform (e.g., a service to view the video content items without any advertisements), an application download for the content sharing platform (e.g., a mobile application to view video content items provided by the content sharing platform on a mobile communications device), etc. The messages component 210 may identify the content of each of the messages as well as user targeting characteristics for each of the messages. For example, demographics preferences and geographical location preferences of users for a particular message may be stored by the messages component 210.

The watch time component 220 may determine a first watch time for a first group of users and a second watch time for a second group of users. The first watch time may be a per-user average amount of time that users of the first group (who were not provided a message) have viewed or interacted with multiple video content items of the content sharing platform and the second watch time may be a per-user average amount of time that the users of the second group have viewed or interacted with video content items of the content sharing platform after being provided the message.

The subscription and download component 230 may identify whether a particular user has subscribed to a service provided by the content sharing platform or has downloaded an application (e.g., the mobile application) to view video content items provided by the content sharing platform. Furthermore, the user log component 240 may identify user interaction with the content sharing platform. For example, the user log component 240 may identify whether a particular user has provided comments for a particular video content item or the types of video content items that the user has viewed. The user log component 240 may not identify any such information in response to a user applying a preference to not use such information for providing a subsequent message as earlier described with respect to FIG. 1. Furthermore, the message delivery component 250 may determine whether to provide a particular message to a user of the content sharing platform. For example, a particular message from the messages component 210 may be selected to be provided to a user based on the watch time of similar users as described in further detail below.

Figure 3:
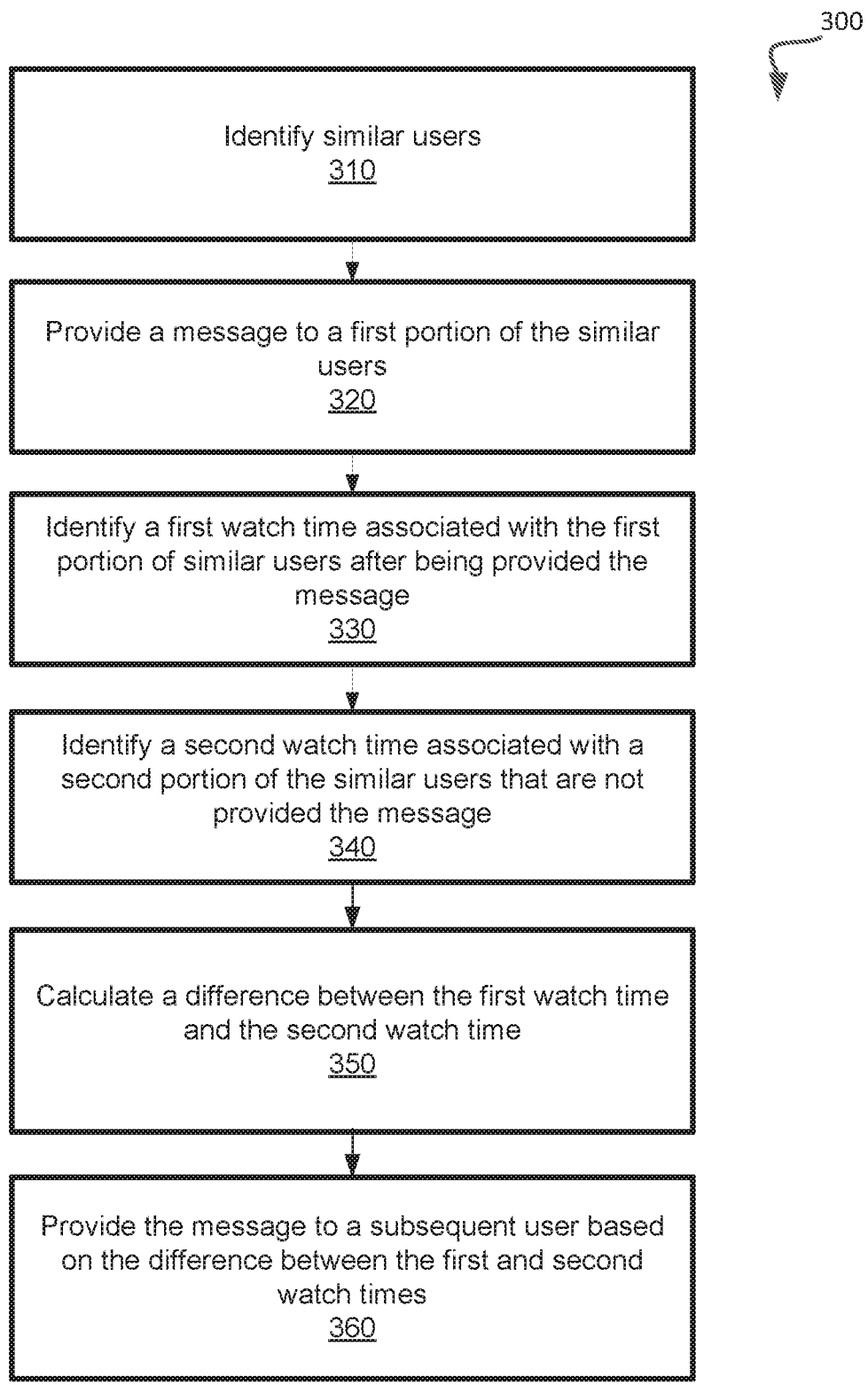
FIG. 3 is a flow diagram of an example method to provide a message based on a change in watch time in accordance with some implementations.

FIG. 3 is a flow diagram of an example method 300 to provide a message based on a change in a watch time. In general, the method 300 may be performed by processing logic that may comprise hardware (e.g., processing device, circuitry, dedicated logic, programmable logic, microcode, etc.), software (e.g., instructions run on a processing device), or a combination thereof. In some implementations, the method 300 may be performed by the message manager 200 of FIG. 1 or 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 3, the method 300 may begin with the processing logic identifying similar users (block 310). For example, a group of users that share one or more characteristics (e.g., demographics, geographical location, types of video content items that the users view) may be identified. The processing logic may further provide a message to a first portion (or group) of the similar users (block 320). For example, a promotional advertisement identifying another video content item, a video content item channel, a subscription service, or an application of the content sharing platform may be displayed to the first portion of similar users when they request to view a particular user interface or location of the content sharing platform (e.g., requesting the home page of the content sharing platform, a search page of the content sharing platform that identifies multiple video content items, a user interface of an application associated with the content sharing platform, etc.). Subsequently, the processing device may identify a first watch time associated with the first portion of similar users after being provided the message (block 330). For example, an average amount of time (e.g., an average number of minutes per user) that the users of the first portion of the group of similar users view video content items may be identified. The amount of time that the user views the video content items may be based on a window of time or a time period after the message is provided to the users of the first portion. For example, the window of time may be a period of time (e.g., two weeks) and the first watch time may be the portion of the window of time (e.g., the total number of minutes) that the users (e.g., on average) were viewing video content items. The amount of time that the users of the first portion view the video content items may correspond to an amount of time that the users view any video content items provided by the content sharing platform. The processing logic may further identify a second watch time associated with a second portion of the group of similar users that are not provided the message (block 340). The second watch time may be based on the same window of time or the period of time that the first watch time is based on. For example, the second watch time may be the portion of the window of time that the users of the second portion viewed video content items after users of the first group were provided the message. The second watch time may correspond to an average amount of time (per user) that the users of the second portion view any video content items provided by the content sharing platform.

Referring to FIG. 3, the processing logic may calculate a difference between the first watch time and the second watch time (block 350). For example, a determination may be made as to identify an amount that the first watch time of the first portion of the similar users who were provided the message decreased relative to the second watch time of the second portion of the similar users who were not provided the message. In some implementations, a determination may be made as to whether the difference between the first watch time and the second watch time exceeds a threshold amount or threshold value as described in further detail below.

As an example, a group of users with similar characteristics may view video content items on the content sharing platform. A first portion of the users may be provided a message and a second portion of the users may not be provided the message. For a time window of two weeks, the watch time of the first portion of the users and the second portion of the users may be identified and a difference in the watch times may be determined. The difference may correspond to a decrease in the watch time of the first portion of the users when compared to the watch time of the second portion of the users. If the difference between the watch times exceeds a threshold amount, then the message may not be provided to another user that has the similar characteristics as the group of users. Otherwise, if the difference between the watch times does not exceed a threshold amount (or the watch time of the first portion of the users exceeds the second portion), then the message may be provided to another user that has similar characteristics. For example, as described in further detail below, the message may be provided to the user based on the user's context, interaction history, and/or an activity rate associated with the message.

Figure 4:
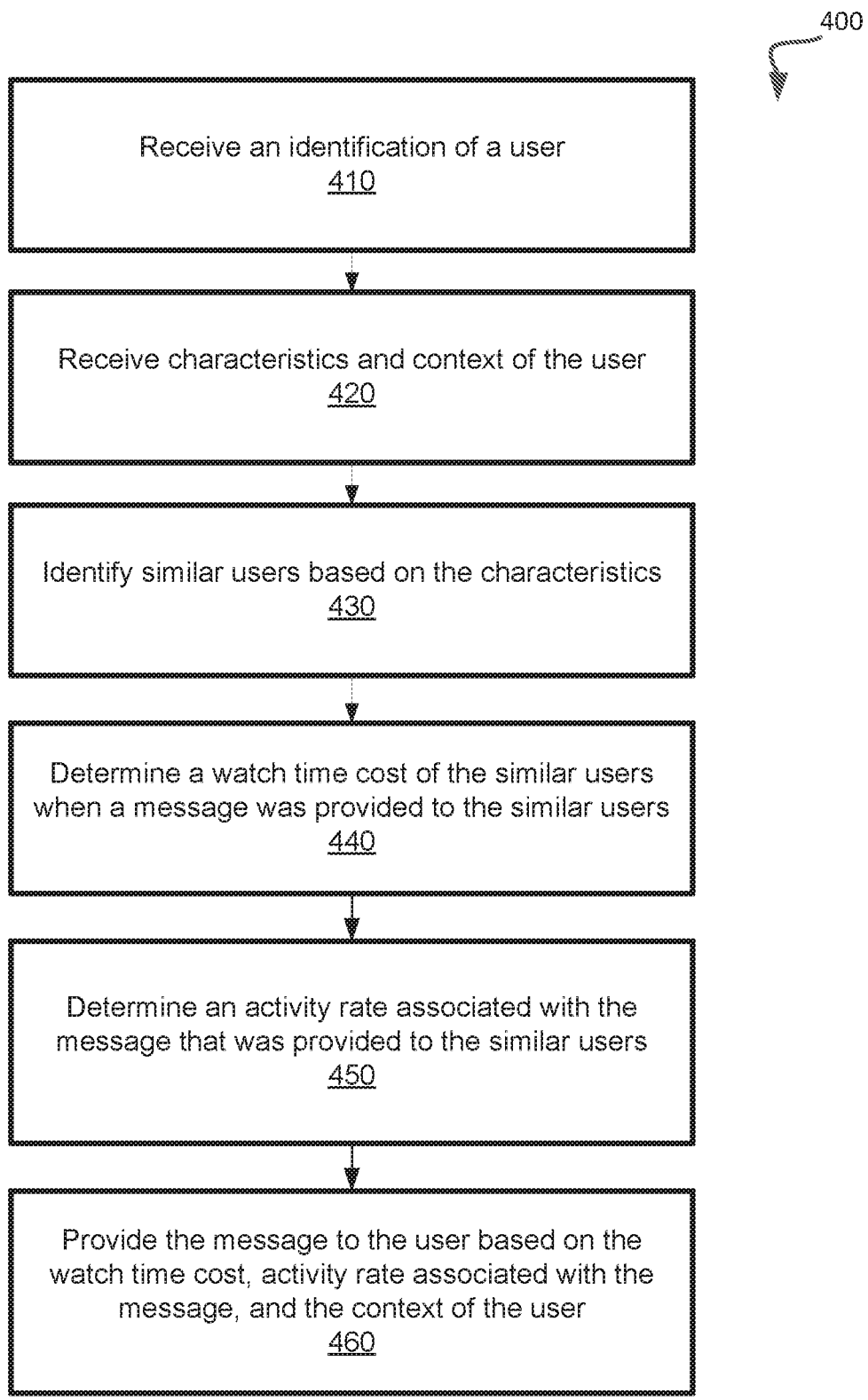
FIG. 4 is a flow diagram of an example method to provide a message based on an activity of users in accordance with some implementations.

FIG. 4 is a flow diagram of an example method to provide a message based on an activity of users. In general, the method 400 may be performed by processing logic that may comprise hardware (e.g., processing device, circuitry, dedicated logic, programmable logic, microcode, etc.), software (e.g., instructions run on a processing device), or a combination thereof. In some implementations, the method 400 may be performed by the message manager 200 of FIG. 1 or 2.

As shown in FIG. 4, the method 400 may receive an identification of a user (block 410). For example, the user may be detected as viewing one or more video content items that are provided by the content sharing platform. The processing logic may further receive characteristics and context of the user (block 420). For example, demographic information, geographical information, preferences of the user (e.g., the types of video content items or channels of video content items that the user views) and other such information may be received. In some implementations, such information is received based on user preferences as earlier described. The context may refer to a user interface (UI) (e.g., a home screen UI, a search UI, etc.) of the content sharing platform that the user has requested to view, an aggregate watch time cost as described in further detail below, user interaction with content (e.g., whether the user has dismissed or not interacted with particular messages), etc. The processing logic may subsequently identify similar users based on the characteristics and history (block 430). For example, other users of the content sharing platform with the same or similar characteristics (e.g., similar demographics, geographical location, etc.) and/or the same or similar history (e.g., the users view the same video content items, the same types or categories or subject matter of video content items, the same or similar channels of video content items, the users view certain types of video content items at similar frequency, etc.) with the user may be identified. Thus, users may be considered to be similar users when one or more characteristics between the users match. The processing logic may subsequently determine a watch time cost of the similar users when a message was provided to the similar users (block 440). For example, a difference between watch time costs between a group of the similar users who were provided the message and another group of the similar users who were not provided the message may be identified to determine an amount of watch time decrease of the similar users who were provided the message. The processing logic may further determine an activity rate associated with the message that was provided to the similar users (block 450). The activity may be whether the similar users subscribed to a service of the content sharing platform (e.g., a subscription service to view video content items without advertisements) and/or whether the similar users downloaded an application (e.g., a mobile application to view the video content items on a mobile communications device), and/or interacted or clicked on the message. The processing device may further provide the message to the user based on the watch time cost, activity rate associated with the message, and the context of the user (block 460). For example, the message may be provided to be viewed by the user if conditions associated with the user satisfy conditions associated with the message as described in further detail in conjunction with FIG. 6.

Figure 5A:
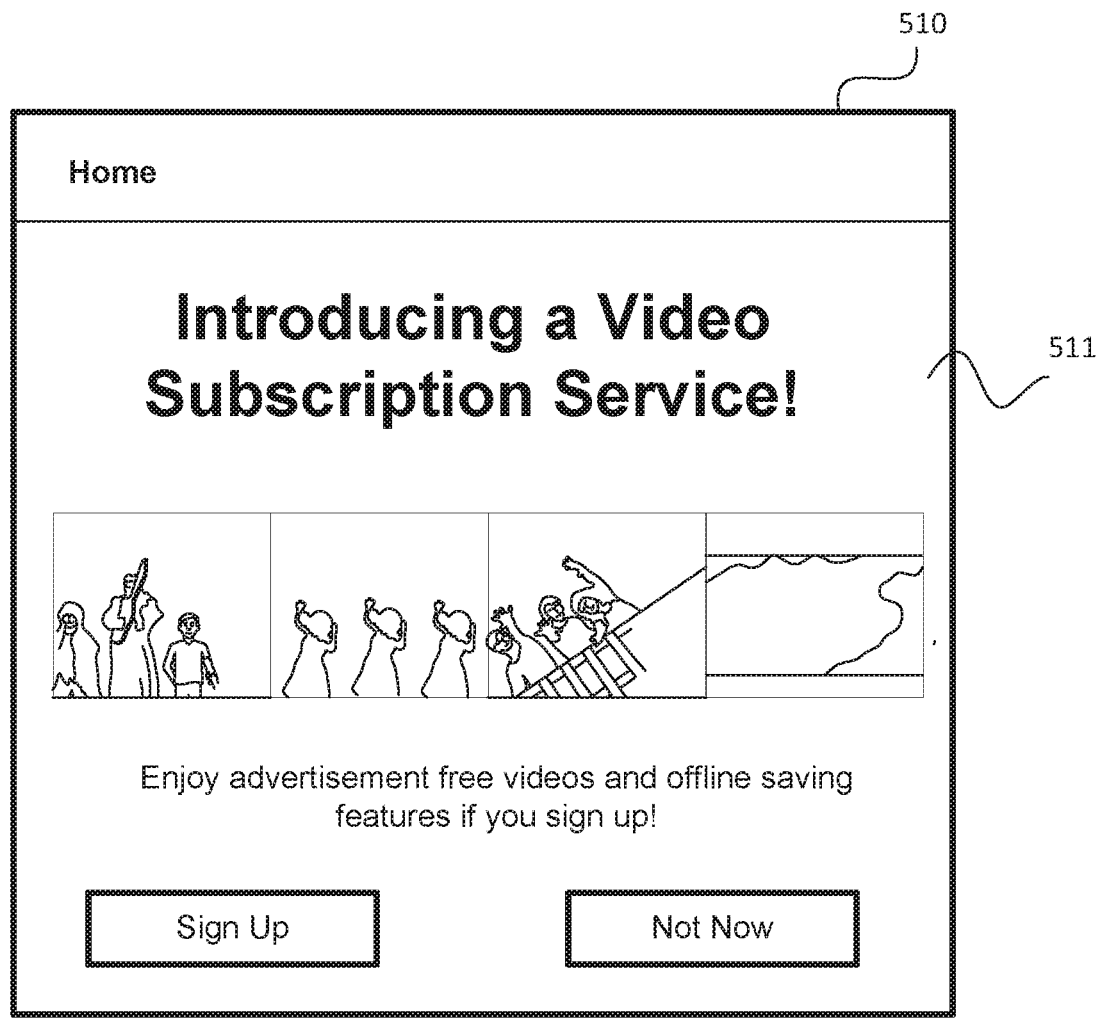
FIG. 5A illustrates an example graphical user interface providing a message in accordance with some implementations of the present disclosure.
Figure 5B:
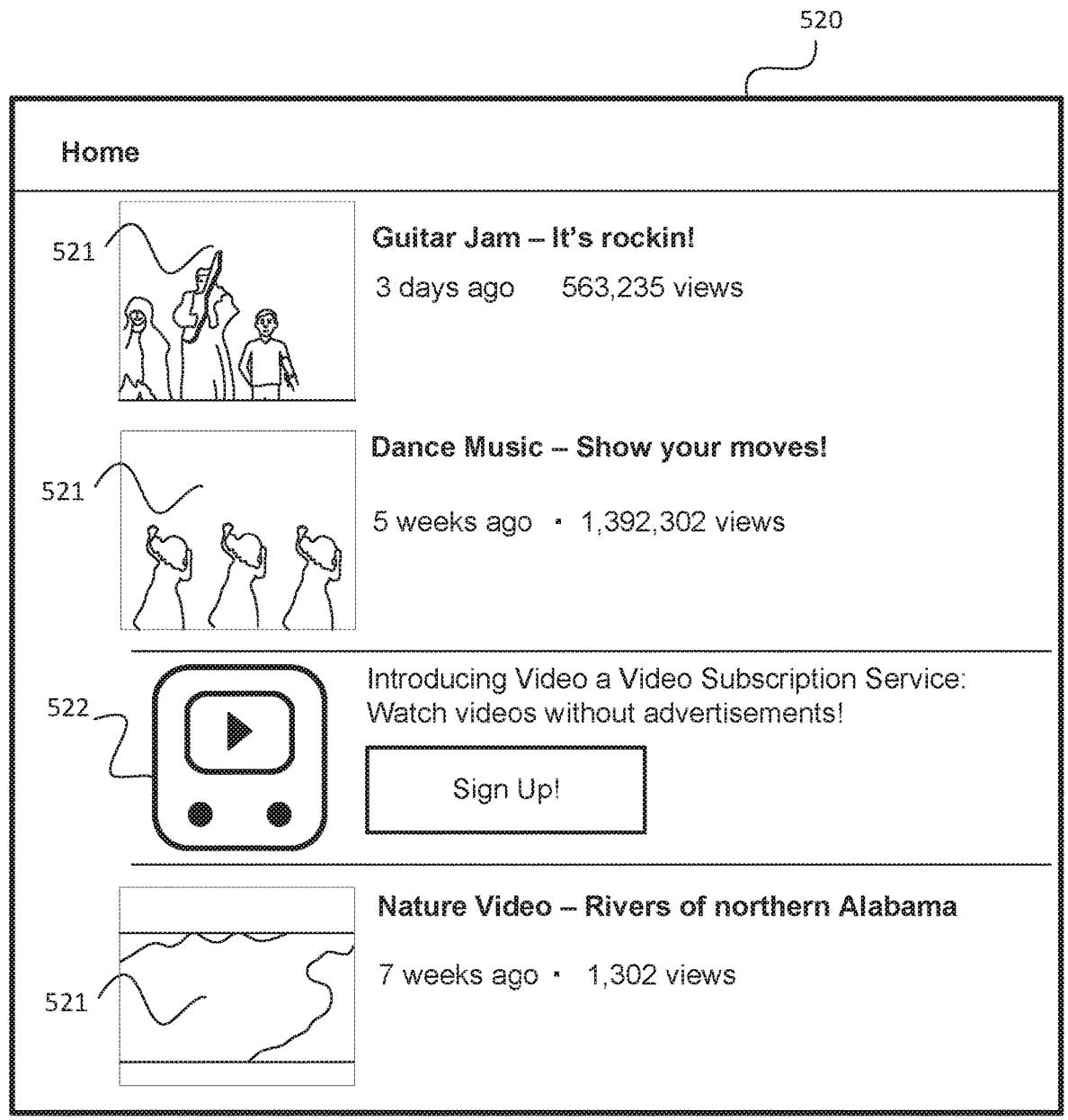
FIG. 5B illustrates an example graphical user interface providing another message in accordance with some implementations of the present disclosure.

FIG. 5A illustrates an example graphical user interface 510 providing a message and FIG. 5B illustrates an example graphical user interface 520 providing another message. In general, the graphical user interfaces 510 and 520 with the messages may be provided by the message component 200 of FIGS. 1 and 2.

As shown in FIG. 5A, the graphical user interface 510 may provide a message 511 that occupies the full portion of the graphical user interface 510. For example, the message 511 may be a promotional advertisement for a video subscription service provided by the content sharing platform. The message 511 may be a full-screen message so that options to select video content items are not viewable or provided while the full-screen message 511 is provided. As shown in FIG. 5B, the graphical user interface 520 may provide a message 522 between options to select various video content items 521. As such, the message 522 may be provided while still providing a user options to select video content items to view or watch.

In some implementations, the message 511 and the message 522 may be associated with different watch time costs (e.g., an amount of decrease in watch time of a user after being provided the message). For example, for a user who is not interested in the message 511 and is not interested in the message 522, the reduction or decrease in the watch time for the user may be larger after being provided the message 511 as opposed to being provided the message 522. In some implementations, the determination to provide the message 511 and 522 to users may be based on the watch time costs of messages as well as the context of users as described in further detail below. For example, a format (e.g., the full-screen message 511 or the smaller message 522) may be determined to be provided to a user based on context of the user.

Figure 6:
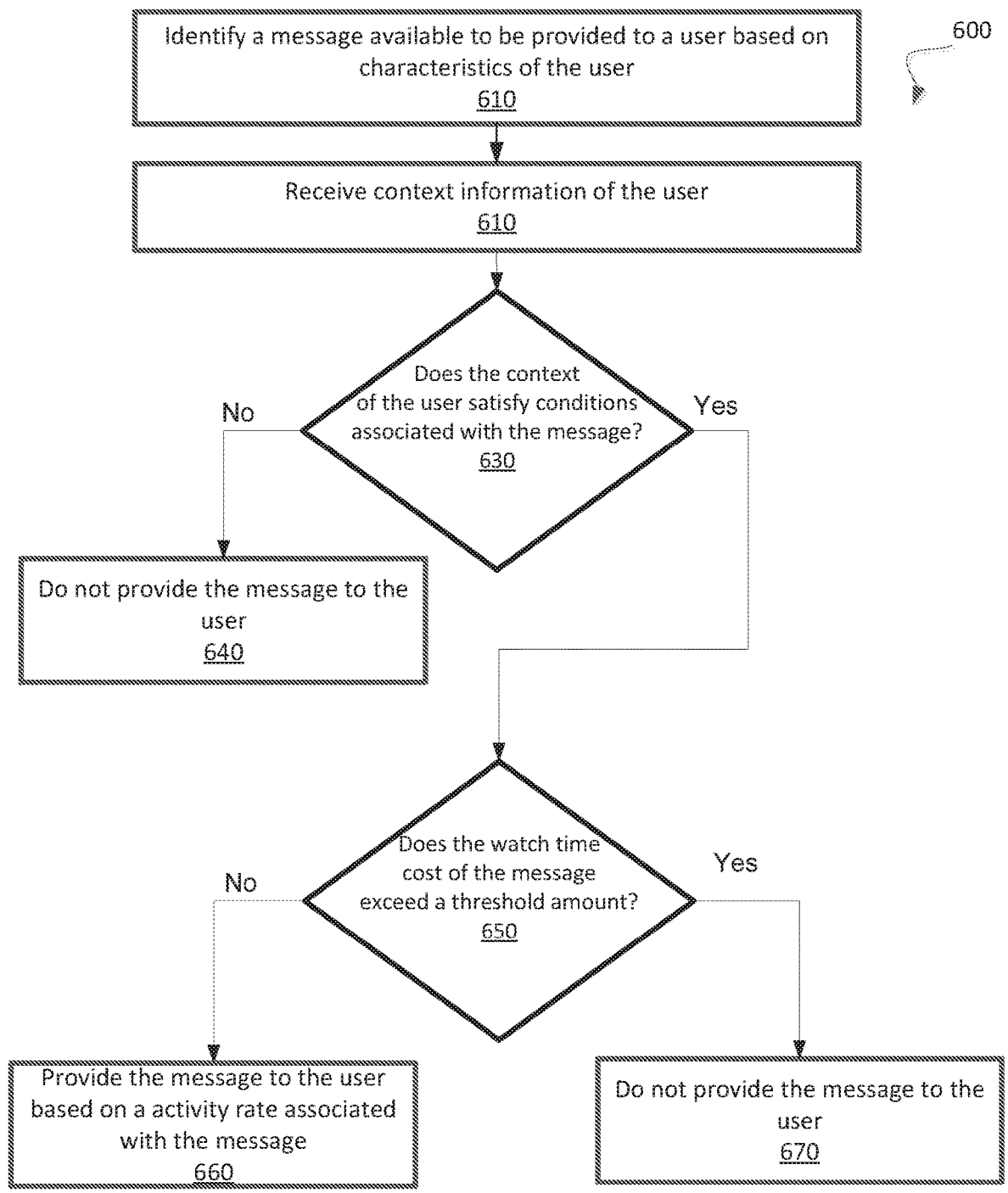
FIG. 6 is a flow diagram of an example method to provide a message to a user in accordance with some implementations.

FIG. 6 is a flow diagram of an example method 600 to provide a message to a user. In general, the method 600 may be performed by processing logic that may comprise hardware (e.g., processing device, circuitry, dedicated logic, programmable logic, microcode, etc.), software (e.g., instructions run on a processing device), or a combination thereof. In some implementations, the method 600 may be performed by the message manager 200 of FIG. 1 or 2.

As shown in FIG. 6, the method 600 may begin with the processing logic identifying a message that is available to be provided to a user based on characteristics of the user (block 610). For example, messages for which a difference in watch time between groups of users (e.g., a first portion of users who were provided the message and a second portion of the users who were not provided the message) with similar characteristics of the user may be identified. The message may be associated with an identified decrease in watch time (e.g., the watch time cost) and an activity rate associated with the message (e.g., click through rate, conversion rate, etc.). The processing logic may further receive context information of the user (block 620). For example, the context information may identify a UI of the content sharing platform that the user is viewing, user interaction history (e.g., the types of video content items that the user views or is requesting to view, whether the user has dismissed particular messages without interacting with the message, etc.), a message history that may identify messages that were provided to the user at prior times and when the messages were provided, and other such information describing the interaction or use of the content sharing platform by the user. The processing logic may further determine whether the context of the user satisfies conditions associated with the message (block 630). For example, one or more conditions of the context of the user may be satisfied in order for the message to be provided to the user. In some implementations, the condition may specify that the message is a candidate message to be provided to the user when the user is viewing a particular UI of the content sharing platform or is requesting to view a particular UI of the content sharing platform (e.g., a front page or a search results page). In the same or alternative implementations, the condition may specify that the message may be a candidate message to be provided to the user when the user has not dismissed the message or a similar message with similar content as the message or when the user has not previously seen or viewed the message. As another example, the message may be a candidate message to be provided to the user based on when the user has viewed or been provided another message of a similar format. For example, the user may be provided one full-screen message once per time period (e.g., once per month) and the message may be selected as a candidate message if the user hasn't been provided another full-screen message during the time period and if the message is a full-screen message.

Referring to FIG. 6, if the context of the user does not satisfy the conditions associated with the message, then the processing logic may not provide the message to the user (block 640). For example, the message may not be selected as a candidate message to be provided to the user as described in further detail below. Otherwise, if the context of the user satisfies conditions associated with the message, then the processing logic may determine whether a watch time cost of the message exceeds a threshold amount (block 650). As previously described, the watch time cost may correspond to a difference between the watch time of a first portion of a group of similar users and a watch time of a second portion of the group of the similar users. For example, the watch time cost may indicate a decrease in the watch time between the first portion of the group of similar users and the second portion of the group of similar users. If the watch time cost exceeds the threshold amount, then the processing logic may not provide the message to the user (block 670). For example, the message may not be selected as a candidate message to be provided to the user. Otherwise, if the watch time cost does not exceed the threshold amount, then the message may be provided to the user based on an activity rate associated with the message (block 660). For example, the message may be selected as a candidate message to be provided to the user and may be provided to the user based on the activity rate (e.g., click through rate or conversion rate) of the message compared to other candidate messages.

As an example, multiple messages may be available to be provided to users. A user may access the content sharing platform and messages that have been provided to similar users relative to the user may be identified. For example, a first portion (e.g., a proper subset) of the messages may be selected based on the characteristics of the user. The context information of the user may subsequently be received. A second portion of the messages may be selected from the first portion where the messages of the second portion satisfy conditions corresponding to context of the user while the other messages that are not selected as candidate messages do not satisfy the conditions. The second portion of messages that satisfy the conditions may be referred to as candidate messages. Furthermore, the second portion of messages may be filtered to remove any messages with a watch time cost that exceeds a threshold amount or threshold value. For example, a message with a decrease in watch time that exceeds the threshold amount may be removed as a candidate message while a message with a decrease in watch time that does not exceed the threshold amount may not be removed as a candidate message. The remaining candidate messages may then be ranked or sorted. For example, the remaining candidate messages may be ranked based on an activity rate associated with each of the messages. In some implementations, the candidate message with the highest activity rate (e.g., highest click-through rate or conversion rate) with a watch time cost that does not exceed the threshold amount may be selected as the message to be provided to the user.

In some implementations, the message may be provided to the user based on an aggregate watch time cost. For example, a message may be provided to the user based on prior messages that have been provided to the user. Each of the prior messages may correspond to a particular watch time cost (e.g., a decrease in the watch time of the first portion of the users). The total watch time cost in aggregate of each of the prior messages may not exceed a threshold amount over a particular time period. For example, if the user was provided three prior messages with a particular total watch time cost (E.g., based on the addition of the watch time costs corresponding to each prior message) and a particular message may correspond to another watch time cost that would exceed a threshold amount when added to the total watch time cost of the three prior messages over a particular time period, then the message may not be selected as a candidate message to be provided to a user.

Figure 7:
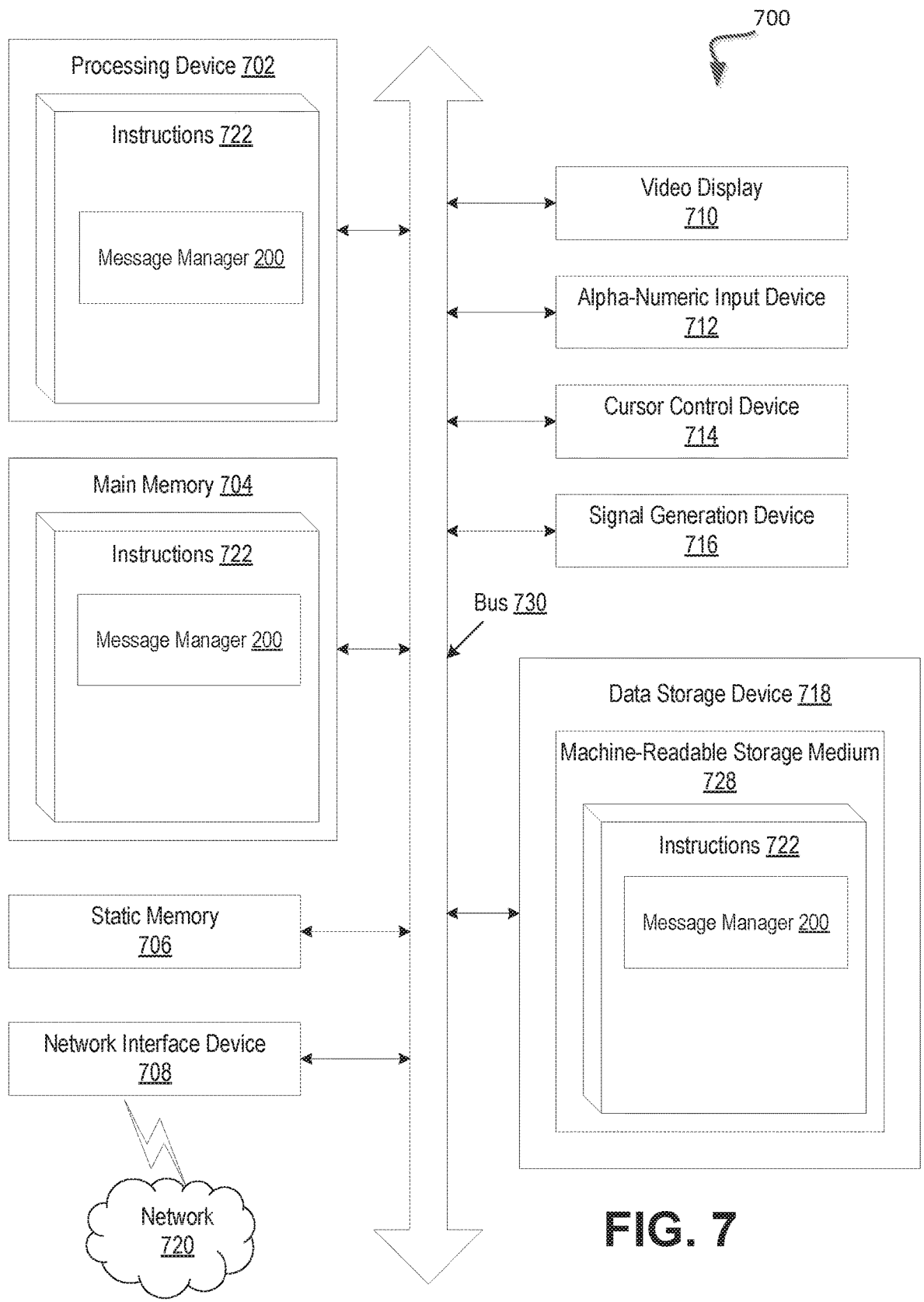
FIG. 7 illustrates a block diagram of an implementation of a computer system in which some implementations of the disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM, etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a message manager (e.g., message manager 200 of FIG. 1 or 2) and/or a software library containing methods that functionality in a message manager. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a processing device of a content sharing platform, a request from a user to view a video content item, the requesting user being associated with a set of preferences and a context;
identifying a group of similar users based on at least one of: one or more preferences in the set of preferences or the context;
upon receiving the request from the user to view the video content item, identifying a first promotional video item corresponding to the video content item;
determining a first watch time value for a first portion of the group of similar users based on a first amount of time during a period of time that users of the first portion of the group have viewed the video content item after being provided the first promotional video item;
determining a second watch time value for a second portion of the group of similar users based on a second amount of time during the period of time that the users of the second portion of the group have viewed the video content item, the first promotional video item not provided to the users of the second portion of the group;
determining a watch time difference between the first watch time value and the second watch time value;
determining an activity rate associated with the first promotional video item that was provided to the group of similar users; and
determining, based on at least one of the watch time difference, the activity rate, or the context of the user, whether to provide the first promotional video item to the user with the video content item.

2. The method of claim 1, further comprising:
determining a number of promotional video items that have been provided to the user;
determining whether the watch time difference exceeds a threshold value;
responsive to determining that the watch time difference does not exceed the threshold value, determining, based on an aggregate watch time cost associated with the number of promotional video items that have been provided to the user, to provide the first promotional video item to the user; and
responsive to determining that the watch time difference does exceed the threshold value, determining not to provide the first promotional video item to the user.

3. The method of claim 1, wherein determining whether to provide the first promotional video item to the user is further based on the context associated with the user satisfying one or more conditions associated with the first promotional video item.

4. The method of claim 1, wherein the context is associated with at least one of a user interface of the content sharing platform providing video content items, an interaction history of the user with the content sharing platform, or an indication of whether prior promotional video items provided to the user were interacted with by the user.

5. The method of claim 1, wherein the activity rate corresponds to a click through rate of the first promotional video item or a conversion rate associated with the first promotional video item.

6. The method of claim 2, wherein the first watch time value corresponds to a first average amount of time each user of the first portion of the group views the video content item during the period of time, and the second watch time value corresponds to a second average amount of time each user of the second portion of the group views the video content item during the period of time.

7. A non-transitory machine-readable storage medium storing instructions which, when executed, cause a processing device to perform operations comprising:
   receiving a request from a user of a content sharing platform to view a video content item, the requesting user being associated with a set of preferences and a context;
   identifying a group of similar users based on at least one of: one or more preferences in the set of preferences or the context;
   upon receiving the request from the user to view the video content item, identifying a first promotional video item corresponding to the video content item;
   determining a first watch time value for a first portion of the group of similar users based on a first amount of time during a period of time that users of the first portion of the group have viewed the video content item after being provided the first promotional video item;
   determining a second watch time value for a second portion of the group of similar users based on a second amount of time during the period of time that the users of the second portion of the group have viewed the video content items, the first promotional video item not provided to the users of the second portion of the group;
   determining a watch time difference between the first watch time value and the second watch time value;
   determining an activity rate associated with the first promotional video item that was provided to the group of similar users; and
   determining, based on at least one of the watch time difference, the activity rate, or the context of the user, whether to provide the first promotional video item to the user with the video content item.

8. The non-transitory machine-readable storage medium of claim 7, the operations further comprising:
   determining a number of promotional video items that have been provided to the user;
   determining whether the watch time difference exceeds a threshold value;
   responsive to determining that the watch time difference does not exceed the threshold value, determining, based on an aggregate watch time cost associated with the number of promotional video items that have been provided to the user, to provide the first promotional video item to the user; and
   responsive to determining that the watch time difference does exceed the threshold value, determining not to provide the first promotional video item to the user.

9. The non-transitory machine-readable storage medium of claim 7, wherein determining whether to provide the first promotional video item to the user is further based on the context associated with the user satisfying one or more conditions associated with the first promotional video item.

10. The non-transitory machine-readable storage medium of claim 7, wherein the context is associated with at least one of a user interface of a content sharing platform providing video content items, an interaction history of the user with the content sharing platform, or an indication of whether prior promotional video items provided to the user were interacted with by the user.

11. The non-transitory machine-readable storage medium of claim 7, wherein the activity rate corresponds to a click through rate of the first promotional video item or a conversion rate associated with the first promotional video item.

12. The non-transitory machine-readable storage medium of claim 8, wherein the first watch time value corresponds to a first average amount of time each user of the first portion of the group views the video content item during the period of time, and the second watch time value corresponds to a second average amount of time each user of the second portion of the group views the video content item during the period of time.

13. A system comprising:
   a memory; and
   a processing device, operatively coupled with the memory, to:
      receive a request from a user of a content sharing platform to view a video content item, the requesting user being associated with a set of preferences and a context;
      identify a group of similar users based on at least one of: one or more preferences in the set of preferences or the context;
      upon receiving the request from the user to view the video content item, identify a first promotional video item corresponding to the video content item;
      determine a first watch time value for a first portion of the group of similar users based on a first amount of time during a period of time that users of the first portion of the group have viewed the video content item after being provided the first promotional video item;
      determine a second watch time value for a second portion of the group of similar users based on a second amount of time during the period of time that the users of the second portion of the group have viewed the video content items, the first promotional video item not provided to the users of the second portion of the group;
      determine a watch time difference between the first watch time value and the second watch time value;
      determine an activity rate associated with the first promotional video item that was provided to the group of similar users; and
      determine, based on at least one of the watch time difference, the activity rate, or the context of the user, whether to provide the first promotional video item to the user with the video content item.

14. The system of claim 13, wherein the processing device is further to:
   determine a number of promotional video items that have been provided to the user;
   determine whether the watch time difference exceeds a threshold value;
   responsive to determining that the watch time difference does not exceed the threshold value, determine, based on an aggregate watch time cost associated with the number of promotional video items that have been provided to the user, to provide the first promotional video item to the user; and
   responsive to determining that the watch time difference does exceed the threshold value, determine not to provide the first promotional video item to the user.

15. The system of claim 13, wherein determining whether to provide the first promotional video item to the user is further based on the context associated with the user satisfying one or more conditions associated with the first promotional video item.

16. The system of claim 13, wherein the context is associated with at least one of a user interface of a content sharing platform providing video content items, an interaction history of the user with the content sharing platform, or an indication of whether prior promotional video items provided to the user were interacted with by the user.

17. The system of claim 13, wherein the activity rate corresponds to a click through rate of the first promotional video item or a conversion rate associated with the first promotional video item.

18. The system of claim 14, wherein the first watch time value corresponds to a first average amount of time each user of the first portion of the group views the video content item during the period of time, and the second watch time value corresponds to a second average amount of time each user of the second portion of the group views the video content item during the period of time.

\* \* \* \* \*